United States Patent
Ferlitsch

(10) Patent No.: US 8,159,707 B2
(45) Date of Patent: Apr. 17, 2012

(54) METHOD AND SYSTEM FOR UNIFIED BATCH JOB PROCESSING

(75) Inventor: Andrew Rodney Ferlitsch, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 736 days.

(21) Appl. No.: 12/221,310

(22) Filed: Aug. 1, 2008

(65) Prior Publication Data

US 2010/0027052 A1 Feb. 4, 2010

(51) Int. Cl.
*G06F 3/12* (2006.01)
*H04N 1/00* (2006.01)

(52) U.S. Cl. ...................................... 358/1.15; 358/405

(58) Field of Classification Search .................. 358/1.15, 358/1.16, 400, 401, 405, 406; 379/100.01, 379/100.06
See application file for complete search history.

(56) References Cited

U.S. PATENT DOCUMENTS

| | | | |
|---|---|---|---|
| 6,271,927 B1 | 8/2001 | Kohtani et al. | |
| 6,369,909 B1 | 4/2002 | Shima | |
| 6,549,947 B1 | 4/2003 | Suzuki | 709/229 |
| 6,757,530 B2 * | 6/2004 | Rouse et al. | 455/412.1 |
| 6,940,615 B1 | 9/2005 | Shima | |
| 7,126,703 B1 | 10/2006 | Gillihan et al. | 358/1.14 |
| 7,299,459 B1 * | 11/2007 | Boyd et al. | 717/137 |
| 2002/0131069 A1 | 9/2002 | Wanda | 358/1.14 |
| 2003/0053810 A1 | 3/2003 | Jackelen et al. | 399/16 |
| 2003/0095284 A1 | 5/2003 | Parry | 358/1.16 |
| 2004/0252322 A1 | 12/2004 | Gassho et al. | 358/1.14 |
| 2006/0036394 A1 * | 2/2006 | Chen et al. | 702/123 |
| 2006/0050307 A1 | 3/2006 | Koike | |
| 2007/0047006 A1 * | 3/2007 | Sakai | 358/400 |
| 2007/0177187 A1 | 8/2007 | Hisatomi | |
| 2008/0297839 A1 | 12/2008 | Kayama et al. | 358/1.15 |
| 2009/0024881 A1 * | 1/2009 | Carroll et al. | 714/57 |

FOREIGN PATENT DOCUMENTS

| | | |
|---|---|---|
| JP | 2002-019198 | 1/2002 |
| JP | 2004-237742 | 8/2004 |
| JP | 2005196624 | 7/2005 |
| JP | 2006-072739 | 3/2006 |
| JP | 2006-085633 | 3/2006 |
| JP | 2006-163984 | 6/2006 |
| JP | 2007-055051 | 3/2007 |

* cited by examiner

*Primary Examiner* — Jerome Grant, II
(74) *Attorney, Agent, or Firm* — Scot A. Reader

(57) ABSTRACT

A more holistic approach to batch job processing simplifies batch job creation, improves user understanding of batch job status and prevents unwanted batch job printing outcomes. In the approach, before printing any print element (e.g. file, document) in a batch job that includes supported print elements and unsupported print elements, a support status indication is outputted for each of the print elements and the user is required to input a group print instruction before the approach proceeds to print the supported print elements. The approach in some embodiments also allows the user to input a group cancel instruction instructing to cancel the batch job without printing any of the print elements and allows the user to input a change instruction requesting modification of one or more unsupported print elements in an attempt to convert them into supported print elements.

10 Claims, 4 Drawing Sheets

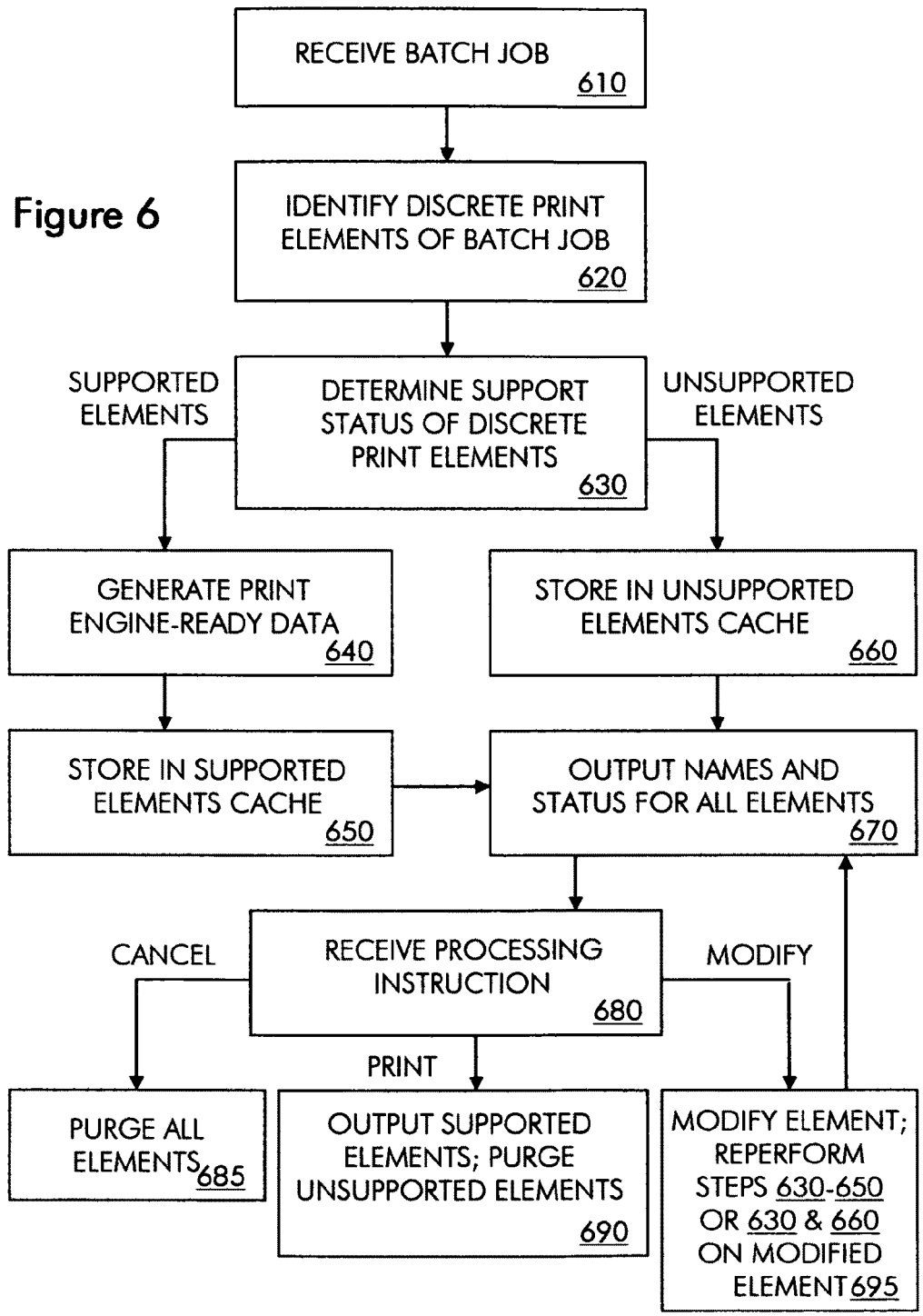

METHOD AND SYSTEM FOR UNIFIED BATCH JOB PROCESSING

BACKGROUND OF THE INVENTION

The present invention relates to batch job processing and, more particularly, to a more holistic approach to batch job processing that simplifies batch job creation, improves user understanding of batch job status and prevents unwanted batch job printing outcomes.

Users who have multiple files that require printing often submit the multiple files as a single batch job. When the component files of a batch job have different characteristics (e.g. formats, print settings), the imaging device to which the batch job is submitted from the user's client device may be able to print only the subset of files from the batch job whose characteristics are supported on the imaging device. Such partially supported batch jobs are handled in several ways depending on the method used to submit the batch job.

In an email printing method, a user submits a batch job as an email message having multiple attached files. The imaging device outputs the supported attachments and skips the unsupported attachments. Accordingly, part of the batch job is printed and part is not, and the imaging device generally does not notify the user as to which attachments from the batch job were printed and which were skipped.

In a Printer Job Language (PJL) separation printing method, a user submits a batch job as a single spool file that includes several documents separated from each other by a PJL header/footer that defines document boundaries. The imaging device outputs the documents serially until the imaging device reaches an unsupported document, at which point processing is terminated. Accordingly, part of the batch job is printed and part is not, and all supported documents are not necessarily printed. Moreover, the imaging device does not generally notify the user which documents from the batch job were printed before processing was terminated.

In a compressed archive printing method, a user submits a batch job as a compressed archive (e.g. zip file) that includes several files. The imaging device determines which files are natively supported by the imaging device and which can be translated into a format supported by the imaging device. Files which are natively supported or translatable into a supported format are printed whereas unsupported files are skipped. Accordingly, part of the batch job is printed and part is not, and the imaging device does not generally notify the user as to which files from the batch job were printed and which were skipped.

In a Web Services (WS) Print method, a user's client device creates a container for a batch job by transmitting a CreatePrintJob message to a WS Print service on an imaging device. The client device then attempts to add multiple documents to the batch job by transmitting to the WS Print service an AddDocument request message for each document. The WS Print service grants requests to add documents that are supported and rejects requests to add documents that are not supported. When there are no more documents to add, the client device transmits to the WS Print service a message indicating to print the batch job and the imaging device prints the batch job. The method requires a batch job container to be created and a request-and-grant message exchange for each document in order for the user to discover which documents have been successfully added to the batch job. Moreover, the method does not support certain legacy batch job printing methods, such as email print, File Transfer Protocol (FTP) print, line printer remote (LPR) print and Universal Serial Bus (USB) print.

SUMMARY OF THE INVENTION

The present invention provides a more holistic approach to batch job processing that simplifies batch job creation, improves user understanding of batch job status and prevents unwonted batch job printing outcomes. In the approach, before printing any print element (e.g. file, document) in a batch job that includes supported print elements and unsupported print elements, a support status indication is outputted for each of the print elements and the user is required to input a group print instruction before the approach proceeds to print the supported print elements. The approach in some embodiments also allows the user to input a group cancel instruction instructing to cancel the batch job without printing any of the print elements and allows the user to input a change instruction requesting modification of one or more unsupported print elements in an attempt to convert them into supported print elements.

In one aspect of the invention, an imaging device comprises an interface and a processor communicatively coupled with the interface, wherein the imaging device receives on the interface a batch job having multiple print elements including one or more supported print elements and one or more unsupported print elements and prior to printing any of the multiple print elements under control of the processor outputs on the interface a support status indication for each of the multiple print elements and a first selection element that allows a user to input a group print instruction instructing to print the supported print elements.

In some embodiments, the imaging device under control of the processor determines support status for at least one of the multiple print elements based at least in part on whether a document format associated with the at least one print element is natively supported on the imaging device.

In some embodiments, the imaging device under control of the processor determines support status for at least one of the multiple print elements based at least in part on whether a document format associated with the at least one print element is supported by a translation service accessible to the imaging device.

In some embodiments, the imaging device under control of the processor determines support status for at least one of the multiple print elements based at least in part on whether a print setting associated with the at least one print element is supported on the imaging device.

In some embodiments, the imaging device under control of the processor determines support status for at least one of the multiple print elements based at least in part on an estimate of whether a usage quota for one or more consumable resources will be exceeded to print the at least one print element.

In some embodiments, the imaging device under control of the processor determines support status for at least one of the multiple print elements based at least in part on an estimate of whether an accounting cost threshold will be exceeded to print the at least one print element.

In some embodiments, the imaging device under control of the processor determines support status for at least one of the multiple print elements based at least in part on whether authorization exists to print the at least one print element.

In some embodiments, the imaging device under control of the processor outputs on the interface an additional selection element that allows a user to input a group cancel instruction instructing to cancel the botch job without printing any of the multiple print elements.

In some embodiments, the imaging device under control of the processor outputs on the interface an additional selection element that allows a user to input a change instruction requesting modification of one or more of the unsupported print elements.

In some embodiments, the interface comprises a network interface and the support status indication and first selection element are contained in one or more embedded web pages transmitted for display on a remote client device.

In some embodiments, the interface comprises a front panel interface and the support status indication and first selection element are contained in one or more user interface descriptions and displayed on the front panel interface.

In some embodiments, the support status indication for at least one supported print element indicates a print-ready status.

In some embodiments, the support status indication for at least one unsupported print element indicates an unsupported document format.

In some embodiments, the support status indication for at least one unsupported print element indicates an unsupported print setting.

In some embodiments, the support status indication for at least one unsupported print element indicates a consumable resource violation.

In some embodiments, the support status indication for at least one unsupported print element indicates an accounting cost violation.

In some embodiments, the support status indication for at least one unsupported print element indicates an authorization violation.

In another aspect of the invention, a method for unified batch job processing comprises the steps of receiving a batch job having multiple print elements including one or more supported print elements and one or more unsupported print elements, determining support status for each of the multiple print elements and outputting prior to printing any of the multiple print elements the determined support status for each of the print elements and a first selection element that allows a user to input a group print instruction instructing to print the supported print elements.

In some embodiments, the determining step comprises determining support status for at least one of the multiple print elements based at least in part on a document format associated with the at least one print element.

In some embodiments, the determining step comprises determining support status for at least one of the multiple print elements based at least in part on a print setting associated with the at least one print element.

In some embodiments, the determining step comprises determining support status for at least one of the multiple print elements based at least in part on an estimate of consumable resources required to print the at least one print element.

In some embodiments, the determining step comprises determining support status for at least one of the multiple print elements based at least in part on an estimate of an accounting cost to print the at least one print element.

In some embodiments, the determining step comprises determining support status for at least one of the multiple print elements based at least in part on an authorization to print the at least one print element.

In some embodiments, the method further comprises the step of outputting an additional selection element that allows a user to input a group cancel instruction instructing to cancel the batch job without printing any of the multiple print elements.

In some embodiments, the method further comprises the step of outputting an additional selection element that allows a user to input a change instruction requesting modification of one or more of the unsupported print elements.

In some embodiments, the method further comprises the steps of generating print engine-ready data for the supported print elements, storing the supported print elements in a supported elements cache and storing the unsupported print elements in an unsupported elements cache.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 6 shows a method for unified batch job processing in some embodiments of the invention.

DETAILED DESCRIPTION OF A PREFERRED EMBODIMENT

Figure 1:
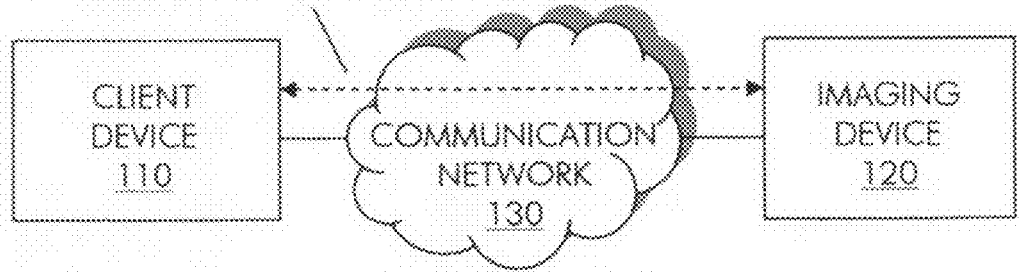
FIG. 1 shows a communication system in which the invention is operative in some embodiments.

FIG. 1 shows a communication system in which the invention is operative in some embodiments. The communication system includes a client device 110 communicatively coupled with an imaging device 120 over a communication network 130. Communication network 130 may consist in a direct communication link, such as a USB connection, Parallel Port connection, or Small Computer Systems Interface (SCSI) connection, or may include multiple communication links interconnected by connecting devices such as Internet Protocol routers, Ethernet switches, wireless local area network (Wi-Fi) access points and wireless metropolitan area network (WiMAX) access points that communicatively couple client node 110 and imaging device 120. Client device 110 and imaging device 120 conduct batch job control flows over communication network 130.

In an exemplary batch job control flow, a user initiates on client device 110 and client device 110 submits to imaging device 120 a batch job having multiple print elements, such as files or documents. The batch job submission may be made using an email printing method in which a user submits a batch job as an email message having multiple attachments, a PJL separation printing method in which a user submits a batch job as a single spool file that includes several documents separated from each other by a PJL header/footer that defines document boundaries, a compressed archive printing method in which a user submits a batch job as a compressed archive (e.g. zip file) that includes several files, an FTP printing method, an LPR printing method, a web page submission method, a WS Print method, or a USB printing method, for example. Before printing any of the print elements in the batch job, imaging device 120 determines a support status for each print element and transmits for outputting on client device 110 on one or more batch job user pages a support status indication for each of the print elements as well as multiple selection elements including a first selection element that allows the user to input a group print instruction instructing imaging device 120 to print the supported print elements, a second selection element that allows the user to input a cancel instruction instructing imaging device 120 to cancel the batch job without printing any of the print elements and a third selection element that allows the user to input a change instruction requesting modification of one or more of the print elements in an attempt to render the modified print element supported.

Figure 2:
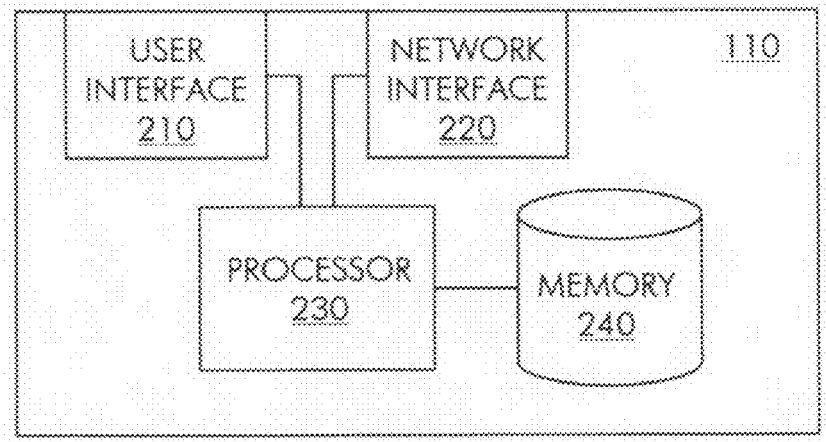
FIG. 2 shows a client device in some embodiments of the invention.

Turning to FIG. 2, client device 110 is shown in more detail. Client device may be a personal computer, personal data assistant (PDA) or cellular phone, for example. Client device 110 includes a user interface 210, a network interface 220 and a memory 240, all of which are communicatively coupled with a processor 230. User interface 210 has an input mechanism, such as a keyboard, keypad or touch screen for accepting inputs from a user and an output mechanism, such as a liquid crystal display (LCD) or cathode ray tube (CRT) for displaying outputs to a user. Network interface 220 is a wired or wireless LAN or MAN interface, such as an Ethernet, Wi-Fi or WiMAX-compliant interface; or a USB, SCSI or Parallel Port interface; or a cellular interface, that communicatively couples client device 110 to communication network 130. Memory 240 includes one or more random access memories (RAM) and one or more read only memories (ROM). Processor 230 executes software installed in memory 240 to carry-out operations on client device 110 including generating and transmitting on network interface 220 batch job submissions having multiple print elements in response to inputs on user interface 210, processing and outputting on user interface 210 batch job user pages received on network interface 220 in response to batch job submissions and generating and transmitting on network interface 220 responses input on batch job user pages.

Figure 3:
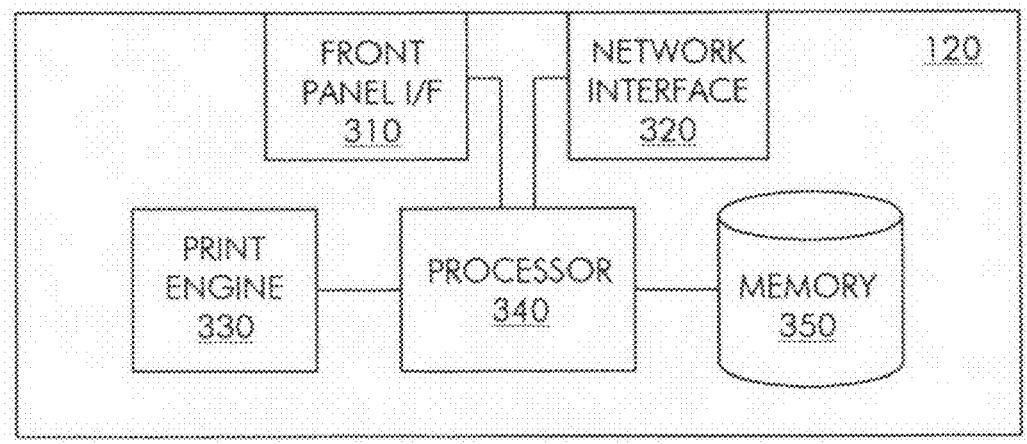
FIG. 3 shows an imaging device in some embodiments of the invention.

In FIG. 3, imaging device 120 is shown in more detail. Imaging device 120 is in some embodiments a multifunction peripheral (MFP) device that supports multiple imaging functions, such as printing, scanning and copying. Imaging device 120 has a front panel interface 310 for accepting inputs from walk-up users and displaying outputs to walk-up users. Imaging device 120 also has a network interface 320 that communicatively couples imaging device 120 to communication network 130. Network interface 320 may be an Ethernet, Wi-Fi or WiMAX-compliant interface, or USB, SCSI or Parallel Port interface, for example. Internal to imaging device 120, interfaces 310, 320 are communicatively coupled with a processor 340, which is also coupled with a memory 350 and print engine 330. Print engine 330 has printer logic, such as one or more integrated circuits (ICs), and an electromechanical section for performing printing functions. The electromechanical section may have, for example, a color ink jet head mounted on a movable carriage for printing a print element under the control of a printer IC, or a fusing system for fusing liquefied toner to paper to print a print element under control of a printer IC. Imaging device 120 may also include other engines, such as a scan/copy engine having scanner/copier logic, such as one or more ICs, and an electromechanical section for performing a scanning and copying functions. The electromechanical section may have, for example, a line image sensor mounted on a movable carriage for optically scanning a document under the control of a scanner IC and storing the scanned document into memory 350. While in the illustrated embodiment an imaging device that supports printing, scanning and copying is described, in other embodiments of the invention an imaging device that supports additional or different imaging-related functions, such as faxing and filing, or a single-function printing device, may be employed. Memory 350 includes one or more RAM and one or more ROM. Processor 340 executes software installed in memory 350 to carry-out operations on imaging device 120 including pre-processing batch job submissions having multiple print elements received on network interface 320, generating and transmitting on network interface 320 batch job user pages in response to batch job submissions, and facilitating printing of batch job submissions in accordance with responses input on batch job user pages received on network interface 320.

In some embodiments, batch jobs may be submitted by walk-up users via front panel interface 310 in lieu of or in addition to batch jobs submitted by remote users via network interface 320. In these embodiments, processor 340 executes software installed in memory 350 to carry-out processing of walk-up batch job submissions, including generating and outputting on front panel interface 310 batch job user pages in response to batch job submissions and facilitating printing of batch job submissions in accordance with responses input on batch job user pages received on front panel interface 310.

Figure 4:
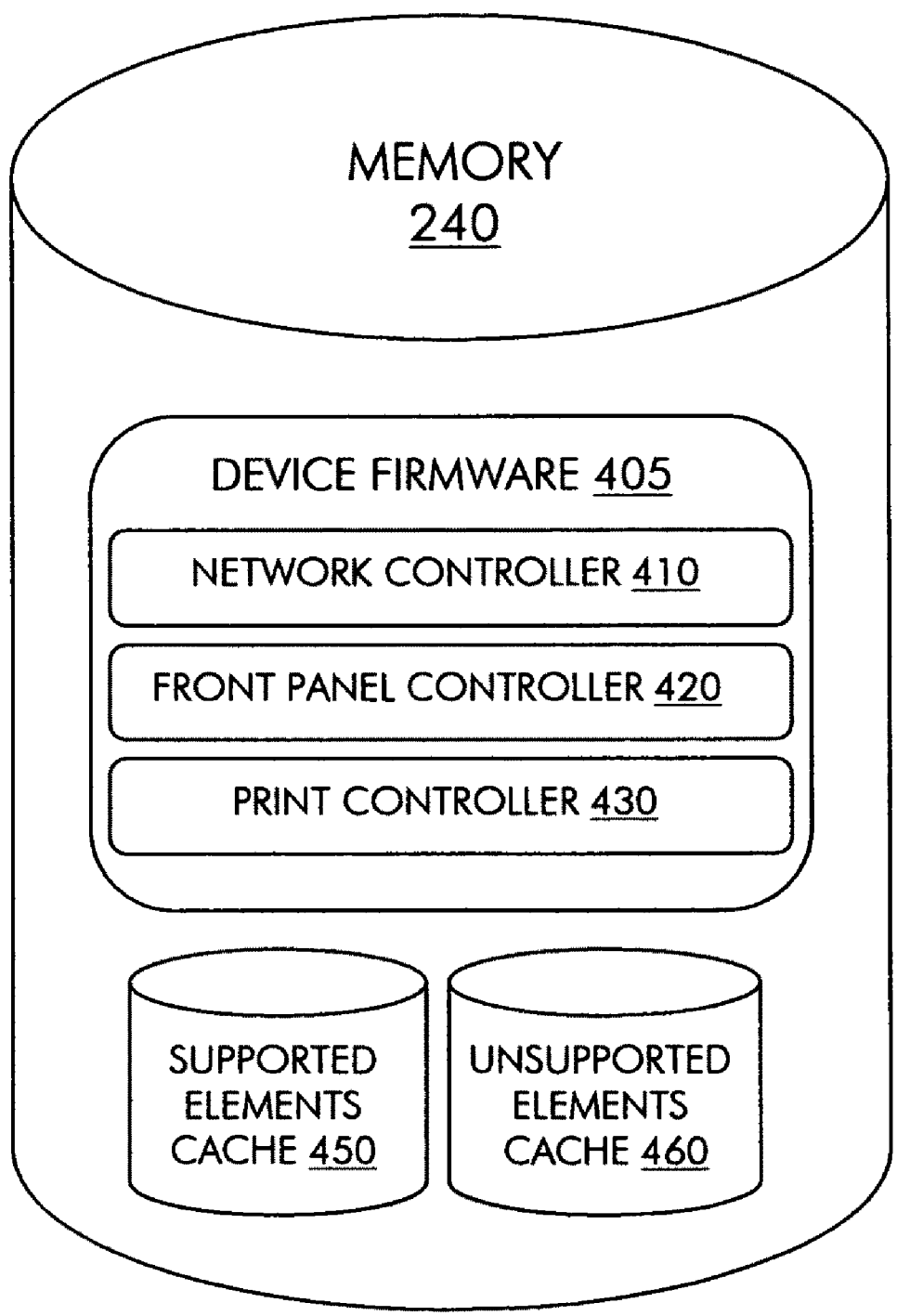
FIG. 4 shows imaging device firmware in some embodiments of the invention.

FIG. 4 shows memory 240 in some embodiments of the invention to include imaging device firmware 405, a supported element cache 450 and an unsupported element cache 460. Firmware 405 includes several software elements that perform functions relating to unified batch job processing.

Network controller 410 manages connectivity with other devices, including client device 110, via network interface 320. Imaging device 120 uses this connectivity to interact with client device 110 and conduct batch job control flows with client device 110. In some embodiments, imaging device 120 also uses this connectivity to interact with external services, such as Web Services, that translate print elements received in document formats that are not natively supported on imaging device 120 into document formats that are supported on imaging device 120, and/or perform external raster image processing (RIP).

Front panel controller 420 manages communication with walk-up users via front panel interface 310. Imaging device 120 uses this communication to interact with walk-up users and conduct batch job control flows with walk-up users.

Print controller 430 performs pre-processing that facilitates unified batch job processing. Pre-processing includes several functions, among them batch job print element identification, support determination, translation, RIP and caching, as well as batch job user page generation.

In the identification function, print controller 430 segments a received batch job into discrete print elements. For example, where a batch job is an email print job, print controller 430 deems each email attachment a discrete print element; where a batch job is a PJL separation print job, print controller 430 parses the PJL spool file and identifies discrete print elements from PJL document boundaries; where a batch job is a compressed archive, print controller 430 opens the archive and deems each file therein a discrete print element. Additionally, a batch job may contain the contents of the batch job or a reference to the contents of the batch job. In the latter case, a batch job may have a Uniform Resource Locator (URL), Uniform Resource Identifier (URI) or a network file path to batch job content, and print controller 430 may retrieve the batch job content using the reference and identify the discrete print elements from the retrieved batch job content.

In the support determination function, print controller 430 checks the format of each identified discrete print element to determine whether the print element is in a natively supported document format and, if not, whether print element is in a document format supported by a translation service accessible to imaging device 120. For example, print controller 430 may deem the document format of a print element natively supported if it is a print engine-ready format compatible with print engine 330, or a device-independent format [e.g. a Tagged Image File Format (TIFF) file] natively supported by print controller 430, or a Page Description Language (PDL) format natively supported by print controller 430 or another document format (e.g. Microsoft Word) that can be supported via a translation service accessible to imaging device 120. Additionally, print controller 430 may determine whether print settings associated with a print element, such as ink type, paper type, paper size, duplex, stapling or hole punching, are supported. Furthermore, print controller 430 may estimate whether utilization of one or more consumable resources (e.g. ink, paper) to print a print element would exceed an available or permissible resource quota. Moreover, print controller 430 may estimate whether the accounting cost expended to print a print element would exceed an available or permissible accounting cost threshold. Further, print controller 430 may determine whether authorization exists to print a print element.

In the translation function, print controller 430 invokes a translation service to translate print elements that require translation into a natively supported document format before performing RIP and generating print engine-ready data for the print elements. Such a translation service may be a guest service on imaging device 120 (e.g. a Java Virtual Machine) or an external Web Service, for example.

In the RIP function, print controller 430 performs RIP and generates print engine-ready data for supported print elements.

In the caching function, print controller 430 stores print engine-ready data for supported print elements in supported element cache 450, and stores unsupported print elements in unsupported element cache 460.

In the page generation function, print controller 430 generates batch job user pages. An exemplary batch job user page includes the name of a batch job and the names and support status of each print element included in a batch job. Support status for supported print elements may be reported on the page as, for example, "ERROR: PROCESSING" (e.g. element supported but error occurred during translation or generation of print engine-ready data) or "HELD" (e.g. element supported; generation of print engine-ready data completed and element stored in supported job cache 450). Support status for unsupported print elements may be reported on the page as, for example, "ERROR: FORMAT" (e.g. imaging device 120 does not support the format of the print element natively or via a translation service), "ERROR: SETTING" (e.g. imaging device 120 does not support a print setting for the print element natively or via a translation service), "ERROR: RESOURCES" (e.g. print controller 430 estimates that the consumable resources needed to print the print element would exceed available or permissible resources), "ERROR: COST" (e.g., print controller 430 estimates that the accounting cost needed to print the print element would exceed a permissible cost), or "ERROR: AUTHORIZATION" (e.g., print controller 430 determines that the authorization needed to print does not exist).

An exemplary batch job user page also includes selection indicators that allow a user to input an instruction respecting an action to be taken on the batch job. Selection indicators presented on the page may include, for example, a "PRINT" button which when depressed effects a group print instruction instructing to print the supported print elements and purge the unsupported print elements, a "CANCEL" button which when depressed effects a group cancel instruction instructing to cancel the batch job without printing any of the print elements, and a "MODIFY" button which when depressed effects a change instruction requesting modification of one or more of the unsupported print elements in an attempt to render them supported. Modifications may include, by way of example, resubmission of an unsupported print element in a supported document format, identifying a translation service that can be used to translate an unsupported print element into a supported format, removing an unsupported print setting, removing unauthorized content, or changing a print setting to reduce the amount or type of consumables required to print a print element.

Batch job user pages generated by print controller 430 are outputted on front panel interface 310 or network interface 320 depending on whether the submitter of the batch job is a user of client device 110 or a walk-up user of front panel interface 310. For example, where a batch job is submitted by a user of client device 110, print controller 430 formats batch job user pages as embedded web pages and invokes network module 410 to transmit the web pages to client device 110 via network interface 320; where a batch job is submitted by a user of front panel interface 310, print controller 430 formats batch job user pages as user interface descriptions and invokes front panel module 420 to output the pages on front panel interface 310.

In addition to pre-processing that facilitates unified batch job processing, print controller 430 executes instructions input on batch job user pages respecting actions to be taken on batch jobs. For example, in response to a "PRINT" instruction, print controller 430 retrieves from supported element cache 450 print engine-ready data for supported print elements in the batch job and submits the print engine-ready data to print engine 330 for output in hard copy format, and purges unsupported print elements in the batch job from unsupported element cache 460. In response to a "CANCEL" instruction, print controller 430 purges supported print elements in the batch job from supported element cache 450 and purges unsupported print elements in the batch job from unsupported element cache 460. In response to a "MODIFY" instruction, print controller 430 changes an unsupported print element as indicated by a user and performs the support determination function on the modified print element to determine if support status for the print element has changed from unsupported to supported as a result of the change. If necessary, for example, if the change is a change to a print setting, print controller 430 accesses the unsupported print element in unsupported element cache 460 to enable the change to be effected.

Supported element cache 450 stores supported print elements of batch jobs in a print engine-ready format. Unsupported element cache 460 stores unsupported elements of batch jobs in a non-print engine ready format. Caches 450, 460 may be maintained in a hard disk, flash memory or RAM, for example. In other embodiments, caches 450, 460, or one of them, are maintained externally or on removable storage element, such as a USB thumb drive.

Figure 5:
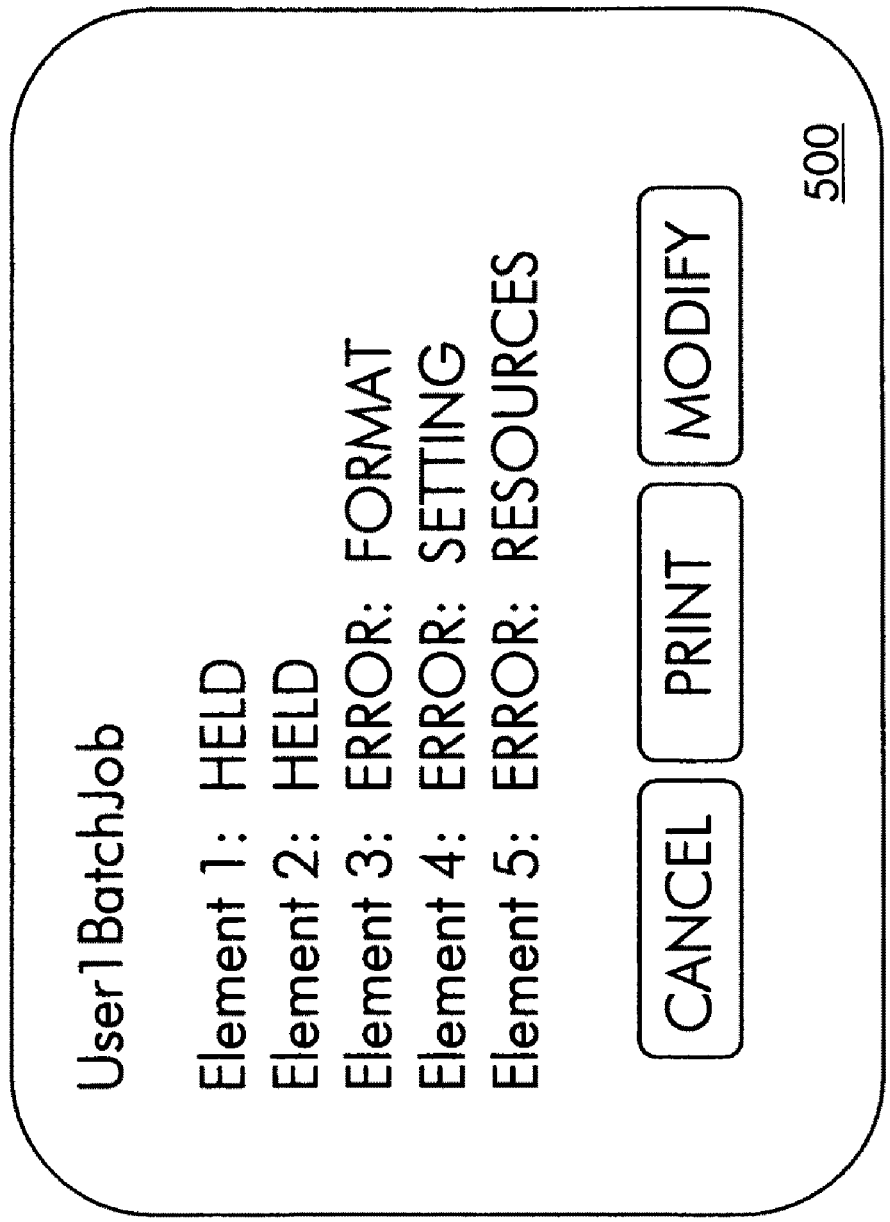
FIG. 5 shows a unified batch job user page in some embodiments of the invention.

FIG. 5 shows an exemplary batch job user page 500. Page 500 may be displayed on user interface 210 of client device 110 if the batch job was submitted by client device 110, and may be displayed on front panel interface 310 if the batch job was submitted by a walk-up user of imaging device 120. In some embodiments, page 500 is displayed on both front panel interface 310 and user interface 210 if the batch job was submitted by client device 110. Page 500 includes the name of a submitted batch job ("User1BatchJob") to which page 500 pertains and the names and support status of each print element in the batch job. In the illustrated example, the batch job includes five print elements, two of which (Element 1, Element 2) are supported and three others of which (Element 3, Element 4, Element 5) are unsupported. The status of Elements 1 and 2 is "HELD" which indicates that these print elements are supported, have been processed and are print-ready. The status of Element 3 is "ERROR: FORMAT" which indicates that Element 3 was submitted in a document format that is not natively supported on imaging device 120 and is not translatable by a translation service accessible to imaging device 120. The status of Element 4 is "ERROR: SETTING" which indicates that Element 4 was submitted with a print setting that is not supported on imaging device 120. The status of Element 5 is "ERROR: RESOURCES" which indicates that print controller 340 has estimated that Element 5 would, under present print settings, consume an unacceptable amount of resources (e.g. ink, paper, etc.) if printed. The support status of Elements 3 through 5 is thus unsupported.

Below the print element names and support status are selection indicators in the form of action buttons. If the user depresses the "PRINT" button, a group print instruction is effected. Print controller 430 retrieves from supported element cache 450 print engine-ready data for supported print elements in the batch job and submits the print engine-ready data to print engine 330 for output in hard copy format, and purges unsupported print elements in the batch job from unsupported element cache 460. If the user depresses the "CANCEL" button, a group cancel instruction is effected. Print controller 430 purges supported print elements in the batch job from supported element cache 450 and purges unsupported print elements in the batch job from unsupported element cache 460. If the user depresses the "MODIFY" button, print controller 430 changes one or more unsupported print elements as indicated by a user and performs the support determination function on the modified print elements to determine if support status for the print element has changed from unsupported to supported as a result of the change. In response to the last-discussed user action, print controller 430 may present the user with additional pages that solicit information from the user about the change (or changes) desired by the user (e.g. resubmission in supported document format, identification of translation service, print setting change).

In some situations, multiple batch jobs from different users may be pending on imaging device 120. In these situations, print controller 430 may generate and cause to be outputted a page that shows the multiple batch jobs and the names and status of their respective print elements, from which a user may select his or her batch job by, for example, touching the batch job name on a touch screen or checking a checkbox. Once selected, a batch job user page specific to the user's batch job is rendered.

FIG. 6 shows a method for unified batch job processing in some embodiments of the invention. Imaging device 120 receives a batch job having multiple print elements via network interface 320 or front panel interface 310 (610) and print controller 430 identifies discrete print elements in the batch job (620). Print controller 430 proceeds to determine the support status of each of the discrete print elements by reference to document format, print settings, consumables, cost and/or authorization, for example (630). If all of the discrete print elements are supported, print controller 430 generates print-engine ready data for all elements of the batch job and invokes imaging engine 330 to print all elements of the batch job without further user intervention. Otherwise, print controller 430 generates print engine-ready data for supported print elements (640) and stores them in supported element cache 450 (650), and stores unsupported print elements in unsupported element cache 460 (660). Print controller 430 generates one or more batch job user pages which are output on network interface 320, front panel interface 310, or both (670), and in response receives a processing instruction from the user who initiated the batch job (680). If the instruction is a group cancel instruction, print controller 430 purges all print elements from the batch job (685). If the instruction is a group print instruction, print controller 430 causes imaging device 120 to output supported print elements and purge unsupported print elements (690). If the instruction is a change instruction, one or more unsupported print elements are modified and the support determination step is re-performed under control of print controller 430 to determine if the modified print element is supported in light of the change (695).

It will be appreciated by those of ordinary skill in the art that the invention can be embodied in other specific forms without departing from the spirit or essential character hereof. For example, while the preferred embodiment involves printing, the invention can be applied to other types of batch jobs submitted for output, such as fax, filing, publishing, format conversion, digital duplication, content download, and/or audio-visual display batch jobs. The present description is therefore considered in all respects to be illustrative and not restrictive. The scope of the invention is indicated by the appended claims, and all changes that come within the meaning and range of equivalents thereof are intended to be embraced therein.

What is claimed is:

1. An imaging device, comprising:
   an interface; and
   a processor communicatively coupled with the interface, wherein the imaging device receives on the interface a batch job having multiple print elements including one or more supported print elements and one or more unsupported print elements and prior to printing any of the multiple print elements under control of the processor outputs on the interface a support status indication for each of the multiple print elements and a first selection element that allows a user to input a group print instruction instructing to print the supported print elements, wherein the interface comprises a front panel interface and the support status indication and first selection element are contained in one or more user interface descriptions and displayed on the front panel interface.

2. The imaging device of claim 1, wherein under control of the processor the imaging device determines support status for at least one of the multiple print elements based at least in part on whether a document format associated with the at least one print element is natively supported on the imaging device.

3. The imaging device of claim 1, wherein under control of the processor the imaging device determines support status for at least one of the multiple print elements based at least in part on whether a document format associated with the at least one print element is supported by a translation service accessible to the imaging device.

4. The imaging device of claim 1, wherein under control of the processor the imaging device determines support status for at least one of the multiple print elements based at least in part on whether a print setting associated with the at least one print element is supported on the imaging device.

5. The imaging device of claim 1, wherein under control of the processor the imaging device determines support status for at least one of the multiple print elements based at least in part on an estimate of whether a usage quota for one or more consumable resources will be exceeded to print the at least one print element.

6. The imaging device of claim 1, wherein under control of the processor the imaging device determines support status for at least one of the multiple print elements based at least in part on an estimate of whether an accounting cost threshold will be exceeded to print the at least one print element.

7. The imaging device of claim 1, wherein under control of the processor the imaging device determines support status for at least one of the multiple print elements based at least in part on whether authorization exists to print the at least one print element.

8. The imaging device of claim 1, wherein under control of the processor the imaging device outputs on the interface an additional selection element that allows a user to input a group cancel instruction instructing to cancel the batch job without printing any of the multiple print elements.

9. The imaging device of claim 1, wherein under control of the processor the imaging device outputs on the interface an additional selection element that allows a user to input a change instruction requesting modification of one or more of the unsupported print elements.

10. The imaging device of claim 1, wherein the interface comprises a network interface and the support status indication and first selection element are contained in one or more embedded web pages transmitted for display on a remote client device.

* * * * *